(12) United States Patent
Derr

(10) Patent No.: US 11,690,466 B2
(45) Date of Patent: Jul. 4, 2023

(54) DISPOSABLE LID FOR FACILITATING HOLDING OF A DETACHABLE STRAW

(71) Applicants: Dedric Michal Derr, Oklahoma City, OK (US); Ricky L. Meyers, Edmond, OK (US)

(72) Inventor: Dedric Michal Derr, Oklahoma City, OK (US)

(73) Assignee: Ricky L. Meyers, Edmond, OK (US)

( * ) Notice: Subject to any disclaimer, the term of this patent is extended or adjusted under 35 U.S.C. 154(b) by 13 days.

(21) Appl. No.: 16/782,613

(22) Filed: Feb. 5, 2020

(65) Prior Publication Data

US 2020/0247595 A1 Aug. 6, 2020

Related U.S. Application Data

(60) Provisional application No. 62/801,517, filed on Feb. 5, 2019.

(51) Int. Cl.
| | |
|---|---|
| *A47G 19/22* | (2006.01) |
| *B65D 51/24* | (2006.01) |
| *B65D 77/28* | (2006.01) |
| *A47G 21/18* | (2006.01) |
| *E01H 1/12* | (2006.01) |
| *B25J 1/04* | (2006.01) |

(52) U.S. Cl.
CPC ....... *A47G 19/2222* (2013.01); *B65D 51/245* (2013.01); *B65D 51/246* (2013.01); *B65D 77/283* (2013.01); *A47G 21/18* (2013.01); *B25J 1/04* (2013.01); *E01H 1/1206* (2013.01)

(58) Field of Classification Search
CPC .... B65D 77/283; B65D 51/24; B65D 51/246; B65D 51/245; A47G 19/2222; A47G 21/18
See application file for complete search history.

(56) References Cited

U.S. PATENT DOCUMENTS

| | | | |
|---|---|---|---|
| 3,291,331 A | 12/1966 | Grisham et al. | |
| 4,744,477 A * | 5/1988 | Wofford | B65D 77/283 |
| | | | 215/229 |

(Continued)

FOREIGN PATENT DOCUMENTS

| | | |
|---|---|---|
| KR | 20010007121 A | 1/2001 |
| KR | 20130020220 A | 2/2013 |
| RU | 2238895 C1 | 10/2004 |

*Primary Examiner* — John K Fristoe, Jr.
*Assistant Examiner* — Jennifer Castriotta

(57) ABSTRACT

Disclosed herein is a disposable lid for facilitating holding of a detachable straw, the disposable lid may include a container lid. Further, the container lid may be openably couplable with a container opening of a container. Further, the container lid may include a straw holder disposed on the container lid. Further, the straw holder may be configured for detachably attaching a straw to the container lid. Further, the straw holder may be configured for detachably attaching the container lid to the container. Further, the straw holder may include a straw holder body. Further, a base holder end of the straw holder body may be attached to a base lid surface of the container lid. Further, the straw holder body may be detachably attachable to a first end of the straw. Further, the straw holder body may be detachably attachable to the container.

7 Claims, 38 Drawing Sheets

(56) References Cited

U.S. PATENT DOCUMENTS

| | | | | |
|---|---|---|---|---|
| 6,431,382 B1* | 8/2002 | Li | ........................ | B65D 77/283 |
| | | | | 220/709 |
| 8,408,410 B2 | 4/2013 | Raman | | |
| 2005/0029270 A1* | 2/2005 | Marshall | ................ | B65D 51/24 |
| | | | | 215/388 |
| 2006/0006134 A1* | 1/2006 | Luo | ..................... | B65D 77/283 |
| | | | | 220/709 |
| 2017/0055739 A1* | 3/2017 | Chen | ................... | B65D 77/283 |

\* cited by examiner

DISPOSABLE LID FOR FACILITATING HOLDING OF A DETACHABLE STRAW

The current application claims a priority to the U.S. Provisional Patent application Ser. No. 62/801,517 filed on Feb. 5, 2019.

FIELD OF THE INVENTION

Generally, the present disclosure relates to the field of containers. More specifically, the present disclosure relates to a disposable lid for facilitating holding of a detachable straw.

BACKGROUND OF THE INVENTION

Many people prefer to drink out of a straw, that is why there are so many aftermarket drinking bottles on the market, each with a different size, shape, and a drinking spout. The manufacturers of beverages (water, soda, etc.) in plastic bottles are at a disadvantage as they all have only one way to dispense the beverage into the mouth of a consumer that is through the opening at the top of the plastic bottle (after the cap has been removed).

Therefore, there is a need for an improved disposable lid for facilitating holding of a detachable straw that may overcome one or more of the above-mentioned problems and/or limitations. Additionally, by providing a means of coupling the bottle, the cap, and the straw the present invention facilitates disposal and recycling of all three components, simultaneously. Thus, reducing the possibility of the straw migrating into a landfill.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a disposable lid for facilitating holding of a detachable straw, the disposable lid may include a container lid. Additionally, the term "disposable" is used herein to refer to a device that can be recycled, repurposed, and or composed of biodegradable materials.

Further, the container lid may be openably couplable with a container opening of the container. Further, the container may be configured for storing at least one beverage. Further, the container lid may include a base lid surface and a top lid surface. Further, the container lid may be associated with a plurality of coupling states in relation to the container opening. Further, the container lid may include a straw holder disposed on the container lid. Further, the straw holder may be configured for detachably attaching a straw to the container lid. Further, the straw holder may be configured for detachably attaching the container lid to the container. Further, the straw holder may include a straw holder body. Further, the straw holder body extends between a base holder end and a tip holder end. Further, the base holder end may be attached to the base lid surface. Further, the straw holder body may be detachably attachable to a first end of the straw. Further, the straw holder body may be detachably attachable to the container. Further, the straw facilitates drinking of the at least one beverage from the container.

Further disclosed herein is a disposable lid for facilitating holding of a detachable straw. Further, the disposable lid may include a container lid and a straw. Further, the container lid may be openably couplable with a container opening of the container. Further, the container may be configured for storing at least one beverage. Further, the container lid may include a base lid surface and a top lid surface. Further, the container lid may be associated with a plurality of coupling states in relation to the container opening. Further, the container lid may include a straw holder disposed on the container lid. Further, the straw holder may be configured for detachably attaching the container lid to the container. Further, the straw holder may include a straw holder body. Further, the straw holder body extends between a base holder end and a tip holder end. Further, the base holder end may be attached to the base lid surface. Further, the straw holder body may be detachably attachable to the container. Further, the straw may be detachably attachable to the container lid. Further, the straw facilitates drinking of the at least one beverage from the container. Further, a first end of the straw may be detachably attachable to the straw holder body.

Further disclosed herein is a disposable container for facilitating holding of a detachable straw. Further, the disposable container may include a container, a straw, and a container lid. Further, the container may be configured for storing at least one beverage. Further, the container may include a container body and a container opening disposed on the container body. Further, the straw may be disposed in the container. Further, the straw facilitates drinking of the at least one beverage from the container. Further, the container lid may include a base lid surface and a top lid surface. Further, the container lid may be openably couplable with the container opening. Further, the container lid may be associated with a plurality of coupling states in relation to the container opening. Further, the container lid may include a straw holder disposed on the container lid. Further, the straw holder may be configured for detachably attaching the straw to the container lid. Further, the straw holder may be configured for detachably attaching the container lid to the container. Further, the straw holder may include a straw holder body. Further, the straw holder body extends between a base holder end and a tip holder end. Further, the base holder end may be attached to the base lid surface. Further, the straw holder body may be detachably attachable to a first end of the straw. Further, the straw holder body may be detachably attachable to the container.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
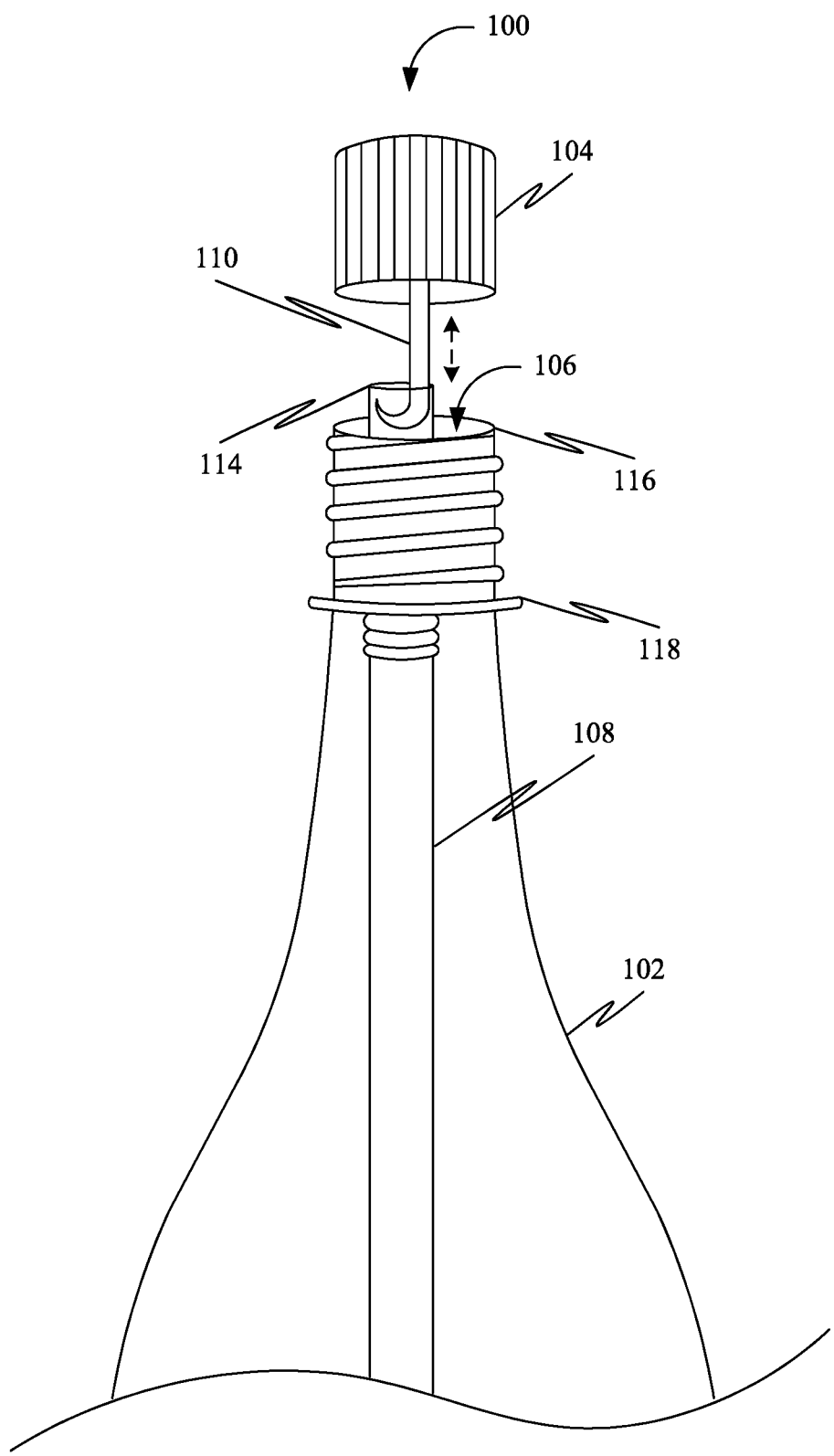
FIG. 1 is a side perspective view of a disposable lid for facilitating holding of a detachable straw, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of beverage containers, embodiments of the present disclosure are not limited to use only in this context.

Overview:

According to some embodiments, a straw may be conveniently housed "inside" a beverage bottle for use by consumers. This is achieved by having a "Straw-Holding Device" installed into the underside of the bottle cap. This "Straw-Holding Device" may be any shape and size and made out of any material suitable for achieving the desired results holding a straw inside of the beverage bottle for ease of use and reuse.

According to some embodiments, a sanitary straw for use housed inside the bottle is disclosed. This provides another option to the consumer to enjoy the beverage, that is through the straw. The bottle cap has a device inside the underneath of the cap to hold a straw. The "Straw-Holding" device secures the straw inside of the beverage by attaching to the cap. Once the cap is removed, the straw remains attached to the lid to easily be removed and used in the drink. It can also be re-attached and re-used for future use. Once done, the bottle even provides a sanitary way to dispose of the straw by dropping it back into the bottle and re-attach cap and throw away, or recycle.

There are numerous styles and shapes that can be used in the underside of the cap to achieve "Straw Holding capabilities".

In an embodiment, the bottle cap may include a head of the genie as the "Straw-Holding" device. The "Straw-Holding" device may be called "Straw-Genie".

Referring now to figures, FIG. 1 is a side perspective view of a disposable lid 100 for facilitating holding of a detachable straw, in accordance with some embodiments. Further, the disposable lid 100 may include a container lid 104. Further, the container lid 104 may be openably couplable with a container opening 106 of a container 102. Further, the container 102 may be configured for storing at least one beverage. Further, the container lid 104 may include a base lid surface and a top lid surface. Further, the container lid 104 may be associated with a plurality of coupling states in relation to the container opening 106. Further, the container lid 104 may include a straw holder 110 disposed on the container lid 104. Further, the straw holder 110 may be configured for detachably attaching a straw 108 to the container lid 104. Further, the straw holder 110 may be configured for detachably attaching the container lid 104 to the container 102. Further, the straw holder 110 may include a straw holder body 112. Further, the straw holder body 112 extends between a base holder end and a tip holder end. Further, the base holder end may be attached to the base lid surface. Further, the straw holder body 112 may be detachably attachable to a first end 114 of the straw 108. Further, the straw holder body 112 may be detachably attachable to the container 102. Further, the straw 108 facilitates drinking of the at least one beverage from the container 102.

Further, in some embodiments, the container 102, the straw 108, and the container lid 104 may include at least one plastic material. Further, the at least one plastic material may be disposable.

Further, in some embodiments, the straw holder body 112 may include a curved member forming a hook. Further, the hook may be configured to latch on the first end 114 of the straw 108 for detachably attaching the straw 108 to the container lid 104.

Further, in some embodiments, the straw holder body 112 may include an elongated body. Further, the elongated body may be associated with a body diameter and a body length. Further, the tip holder end may be configured to enter the straw 108 along the body length. Further, the straw 108 may be associated with a straw diameter. Further, the straw diameter may be greater than the body diameter. Further, in an embodiment, the straw holder body 112 may be elastically deformable allowing the straw holder body 112 to transition between a secure state and a separate state based on an external force. Further, the straw 108 detaches from the straw holder body 112 in the separate state and the straw 108 attaches to the straw holder body 112 in the secure state. Further, in an embodiment, the straw 108 may be elastically deformable allowing the straw 108 to transition between a secure state and a separate state based on an external force. Further, the straw 108 detaches from the tip holder end in the separate state and the straw 108 attaches to the tip holder end in the secure state.

Further, in some embodiments, the straw holder body 112 may include at least one coupling mechanism. Further, a first part of the at least one coupling mechanism may be disposed on the straw holder body 112 and a second part of the at least one coupling mechanism may be disposed on the first end 114 of the straw 108. Further, the first part and the second part are detachably couplable.

Further, in some embodiments, the straw holder 110 may include a reusable adhesive disposed on the straw holder body 112. Further, the reusable adhesive detachably attaches the first end 114 of the straw 108 to the straw holder body 112.

Further, in some embodiments, the plurality of coupling states may include an open state and at least one closed state. Further, the straw may be configured to transition between an attached state and a removed state in relation to the straw holder body 112 in the open state.

Further, in some embodiments, the container lid 104 may be inseparably attached to the straw holder 110. Further, the base lid surface of the container lid 104 may be inseparably attached to the base holder end of the straw holder body 112 of the straw holder 110.

Further, in some embodiments, the straw holder 110 may be inseparably attached to the straw 108. Further, the straw holder body 112 of the straw holder 110 may be inseparably attached to the first end 114 of the straw 108.

Further, in some embodiments, the container lid 104, the straw holder 110, and the straw 108 are inseparably attached. Further, the base lid surface of the container lid 104 may be inseparably attached to the base holder end of the straw holder body 112 of the straw holder 110 and the straw holder body 112 of the straw holder 110 may be inseparably attached to the first end 114 of the straw 108.

Further, in some embodiments, the straw holder body 112 may include a curved member forming a hook. Further, the hook may be configured to latch on a container rim 116 of the container opening 106 for detachably attaching the container lid 104 to the container 102.

Further, in some embodiments, the straw holder body 112 may include a compliant curved member. Further, the compliant curved member may be configured to encircle the container 102 proximal to the container opening 106 for detachably attaching the container lid 104 to the container 102.

Further, in some embodiments, the container 102 may include a container band 118 disposed proximal to the container opening 106. Further, the straw holder body 112 may include a curved member forming a hook. Further, the hook may be configured to latch on the container band 118 for detachably attaching the container lid 104 to the container 102.

Figure 8:
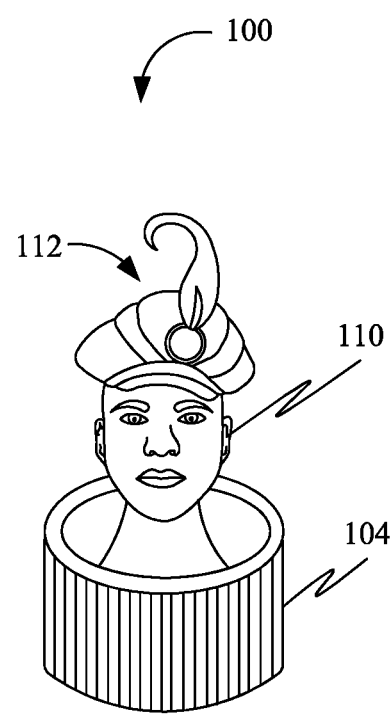
FIG. 8 is a front perspective view of the disposable lid, in accordance with some embodiments.

Further, in some embodiments, the straw holder body 112 may be configured in an anthropomorphic face, as shown in FIG. 8.

Further, in some embodiments, the straw holder body 112 may include a hollow elongated body. Further, the hollow elongated body may be associated with a body diameter and a body length. Further, the tip holder end may include an end opening. Further, the straw 108 enters the hollow elongated body along the body length through the end opening. Further, the straw 108 may be associated with a straw diameter. Further, the straw diameter may be less than the body diameter. Further, in an embodiment, the straw holder body 112 may be elastically deformable allowing the straw holder body 112 to transition between a secure state and a separate state based on an external force. Further, the straw 108 detaches from the straw holder body 112 in the separate state and the straw 108 attaches to the straw holder body 112 in the secure state.

Figure 2:
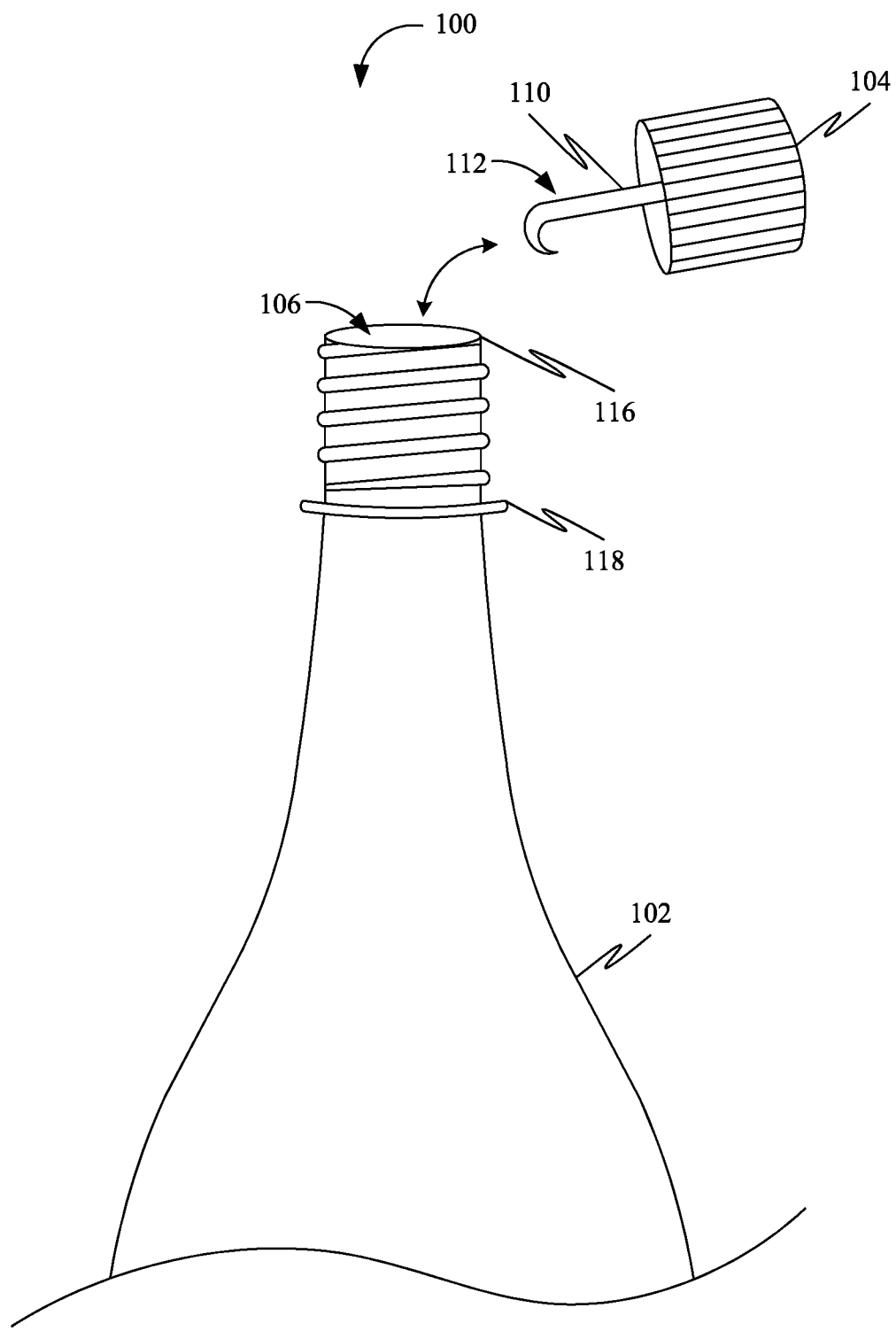
FIG. 2 is a side perspective view of the disposable lid with a container lid removed from a container, in accordance with an exemplary embodiment.
Figure 3:
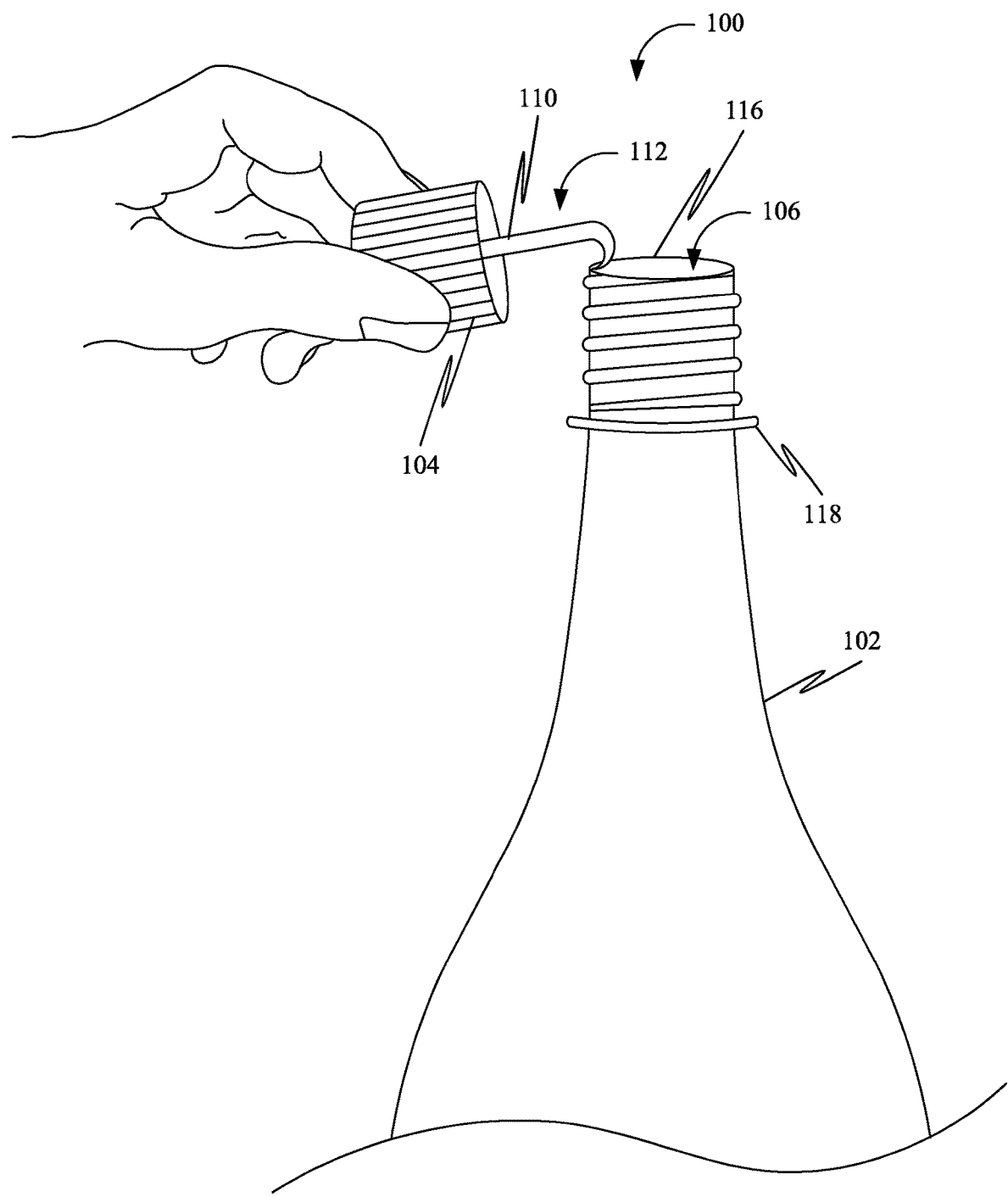
FIG. 3 is a side perspective view of the disposable lid with the container lid attached to the container, in accordance with an exemplary embodiment.

FIG. 2 is a side perspective view of the disposable lid 100 with a container lid 104 removed from a container 102, in accordance with an exemplary embodiment. FIG. 3 is a side perspective view of the disposable lid 100 with the container lid 104 attached to the container 102, in accordance with an exemplary embodiment. Further, the straw holder body 112 may include the curved member forming the hook. Further, the hook may be configured to latch on the container rim 116 of the container opening 106 for detachably attaching the container lid 104 to the container 102.

Figure 4:
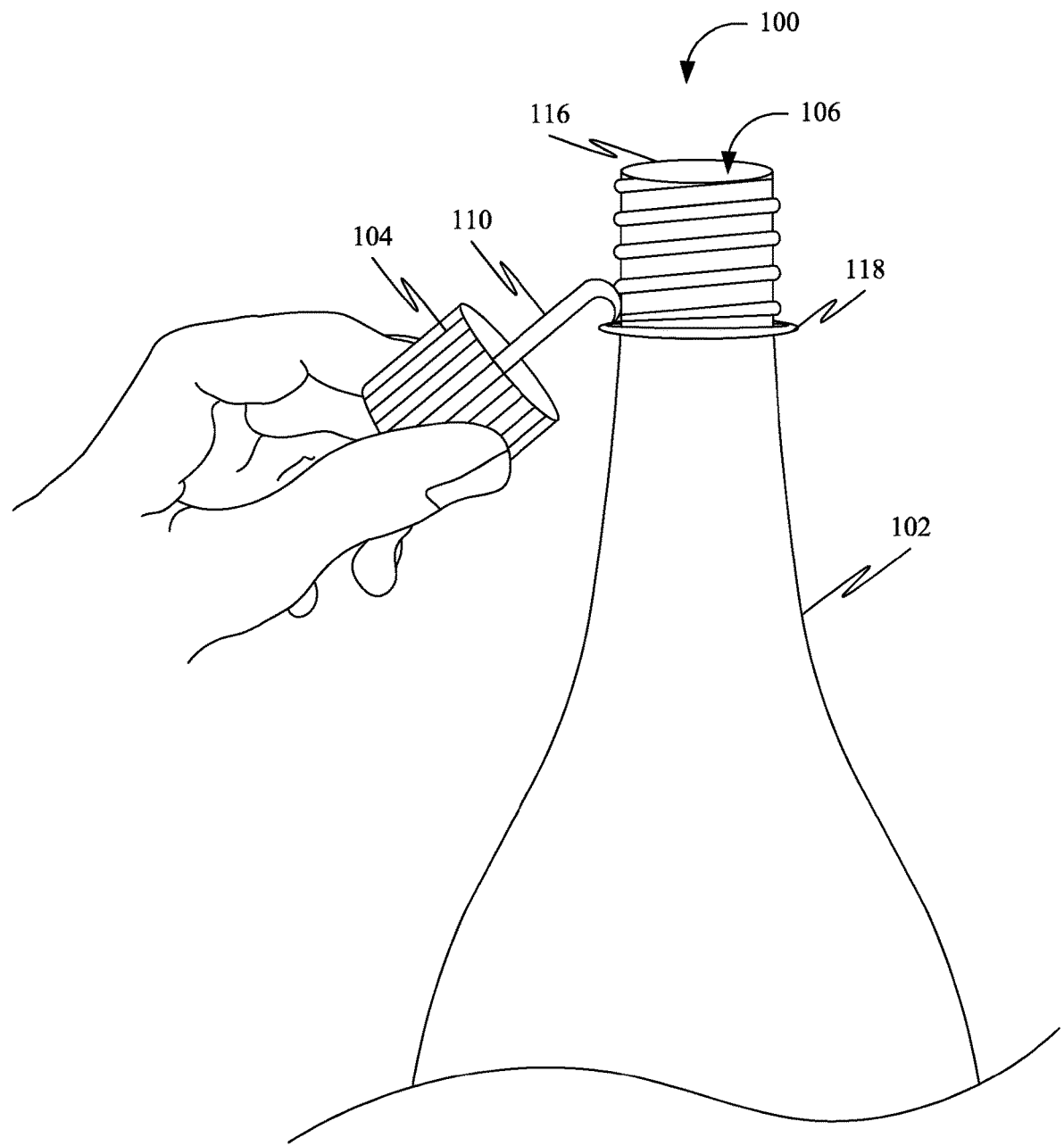
FIG. 4 is a side perspective view of the disposable lid with the container lid attached to the container, in accordance with an exemplary embodiment.

FIG. 4 is a side perspective view of the disposable lid 100 with container lid 104 attached to the container 102, in accordance with an exemplary embodiment. Further, the container 102 may include the container band 118 disposed proximal to the container opening 106. Further, the straw holder body 112 may include the curved member forming the hook. Further, the hook may be configured to latch on the container band 118 for detachably attaching the container lid 104 to the container 102.

Figure 5:
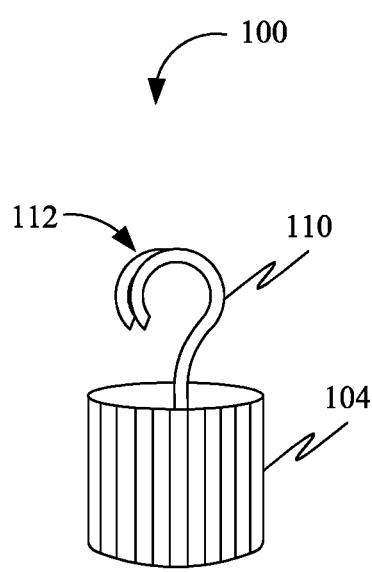
FIG. 5 is a side perspective view of the disposable lid, in accordance with some embodiments.
Figure 6:
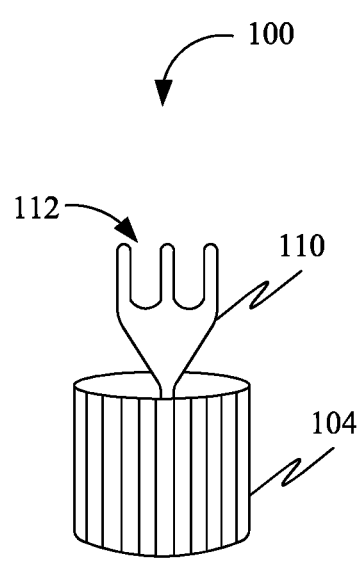
FIG. 6 is a rear perspective view of the disposable lid, in accordance with some embodiments.
Figure 7:
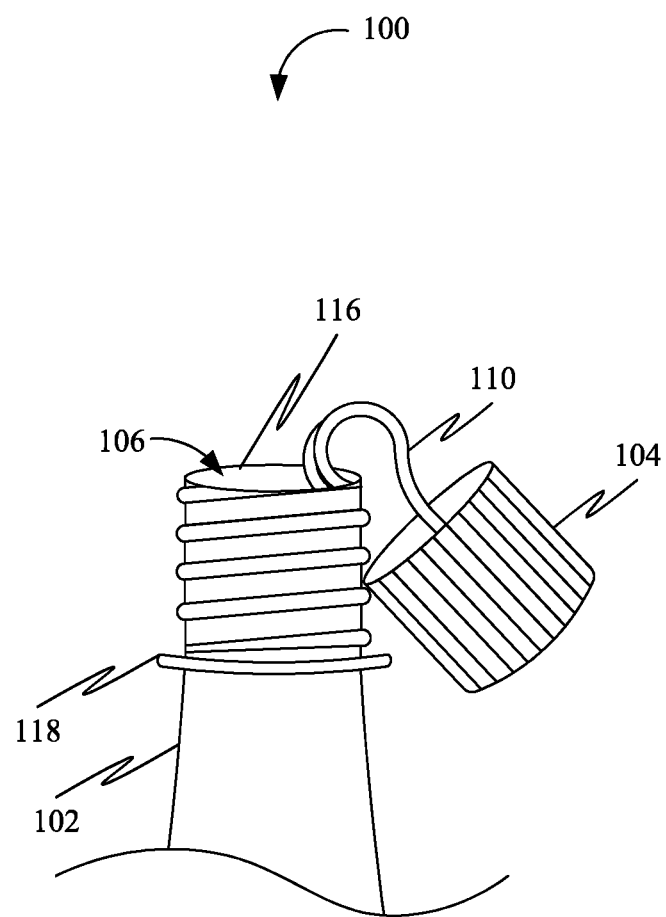
FIG. 7 is a side perspective view of the disposable lid with the container lid attached to the container, in accordance with an exemplary embodiment.
Figure 9:
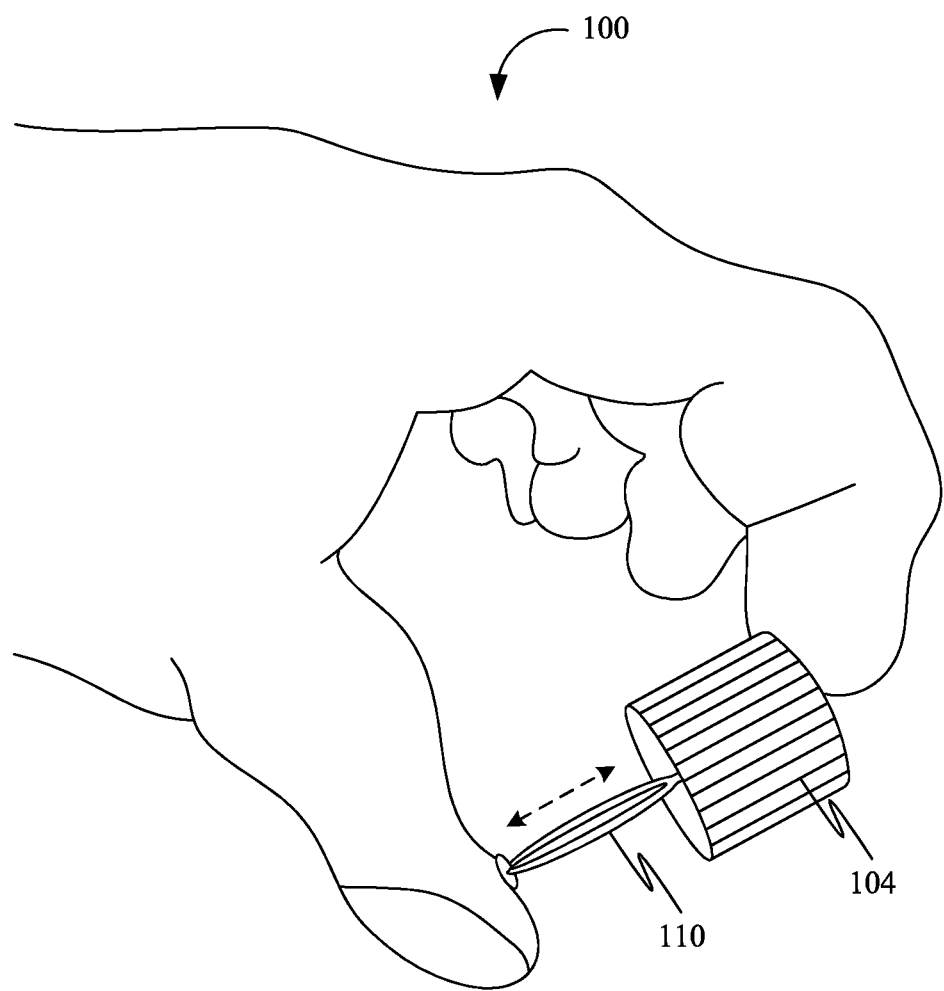
FIG. 9 is a side perspective view of the disposable lid, in accordance with some embodiments.
Figure 10:
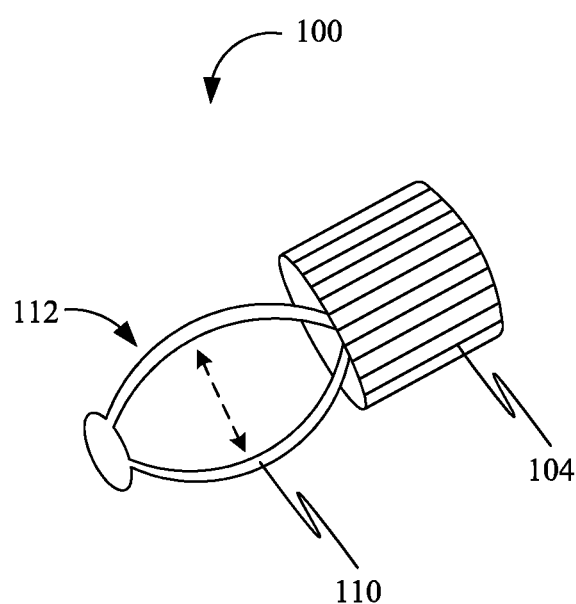
FIG. 10 is a side perspective view of the disposable lid, in accordance with some embodiments.
Figure 11:
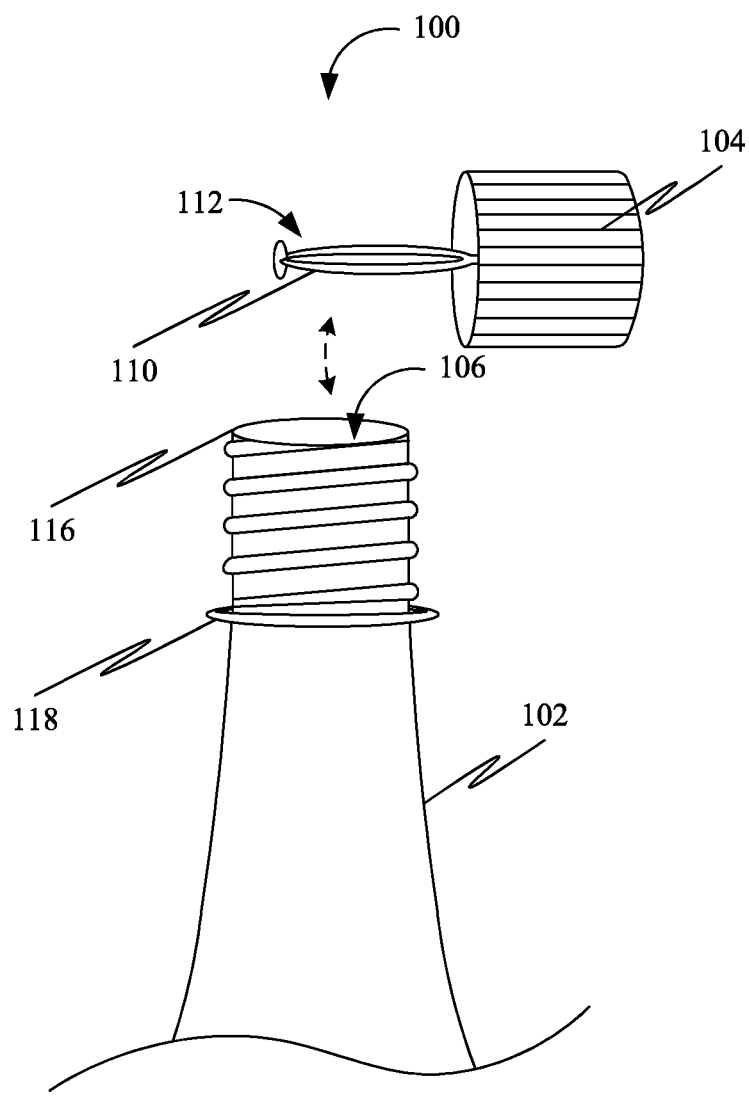
FIG. 11 is a side perspective view of the disposable lid with the container lid removed from the container, in accordance with an exemplary embodiment.
Figure 12:
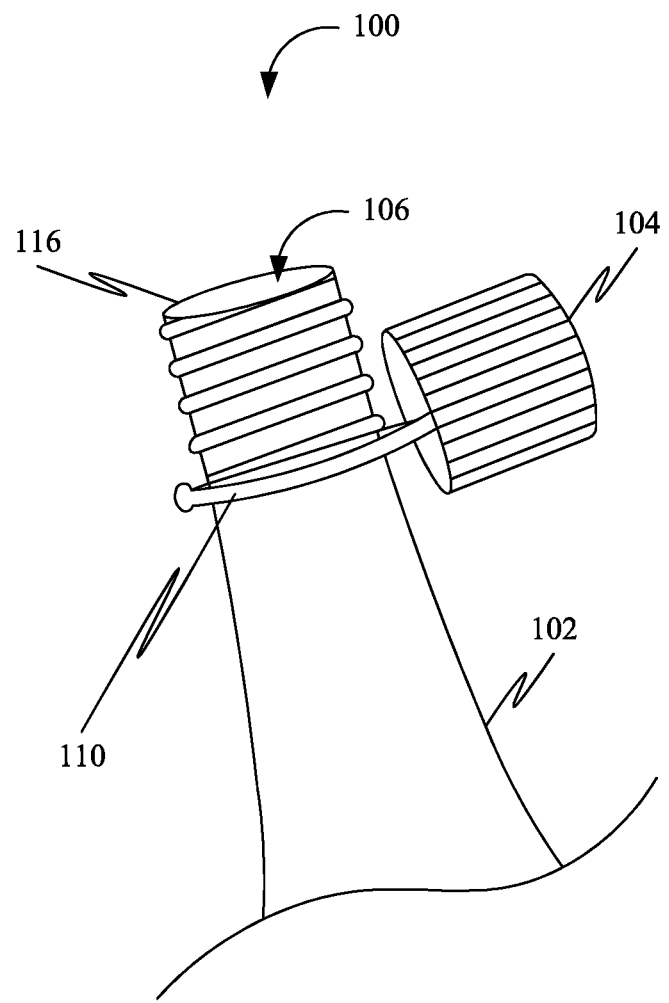
FIG. 12 is a side perspective view of the disposable lid with the container lid attached to the container, in accordance with an exemplary embodiment.

FIG. 5 is a side perspective view of the disposable lid 100, in accordance with some embodiments. FIG. 6 is a rear perspective view of the disposable lid 100, in accordance with some embodiments. FIG. 7 is a side perspective view of the disposable lid 100 with the container lid 104 attached to the container 102, in accordance with an exemplary embodiment. FIG. 8 is a front perspective view of the disposable lid 100, in accordance with some embodiments. FIG. 9 is a side perspective view of the disposable lid 100, in accordance with some embodiments. FIG. 10 is a side perspective view of the disposable lid 100, in accordance with some embodiments. FIG. 11 is a side perspective view of the disposable lid 100 with the container lid 104 removed from the container 102, in accordance with an exemplary embodiment. FIG. 12 is a side perspective view of the disposable lid 100 with the container lid 104 attached to the container 102, in accordance with an exemplary embodiment. Further, the container 102 may include the container band 118 disposed proximal to the container opening 106. Further, the straw holder body 112 may include the curved member forming the hook. Further, the hook may be configured to latch on the container band 118 for detachably attaching the container lid 104 to the container 102.

Figure 13:
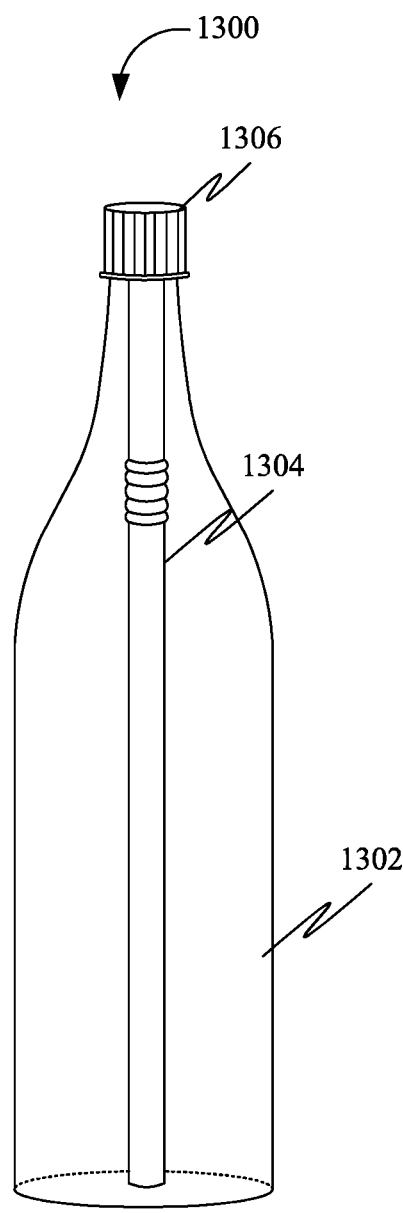
FIG. 13 is a front view of a beverage container, in accordance with some embodiments.
Figure 14:
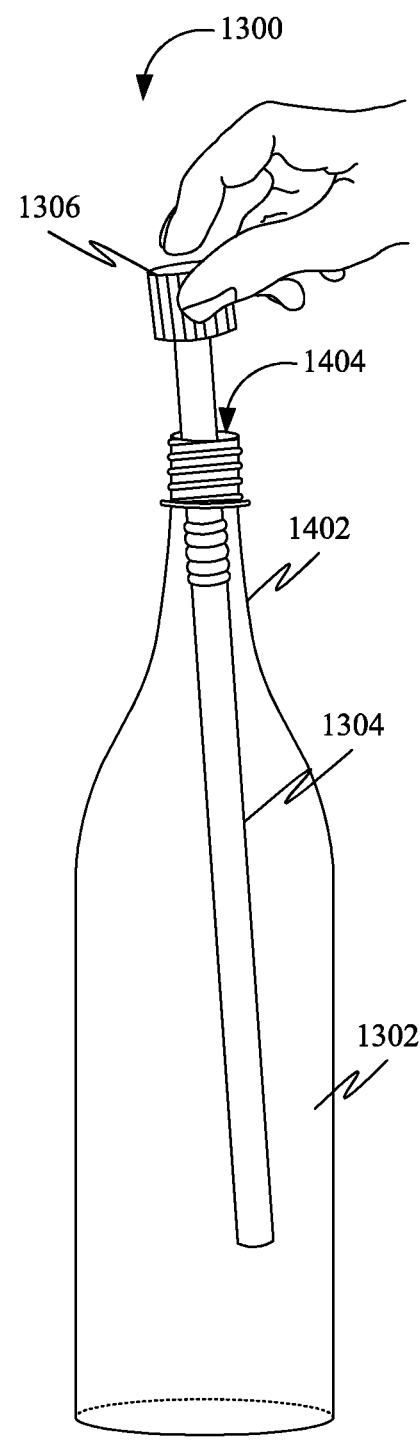
FIG. 14 is a front view of the beverage container with a container lid removed from a container opening, in accordance with some embodiments.

Referring now to figures, FIG. 13 is a front view of a beverage container 1300, in accordance with some embodiments. The beverage container 1300 may include a container 1302 configured for storing at least one beverage. For example, the at least one beverage may include water, juice, soda, etc. Further, the container 1302 may include a container body 1402 and a container opening 1404 disposed on the container body 1402, as shown in FIG. 14.

Further, the beverage container 1300 may include a straw 1304 disposed of in the container body 1402. Further, the straw 1304 may facilitate drinking of the at least one beverage from the container 1302.

Further, the beverage container 1300 may include a container lid 1306 comprising a base lid surface and a top lid surface. Further, the container lid 1306 may be openably couplable with the container opening 1404. Further, the container lid 1306 may be associated with a plurality of coupling states in relation to the container opening 1404. Further, the container lid 1306 may include a straw holder disposed on the container lid 1306. Further, the straw holder may include a straw holder body. Further, the straw holder body extends between a base holder end and a tip holder end. Further, the base holder end may be attached to the base lid surface and the tip holder end may be detachably attachable to a first end of the straw 1304. Further, the container lid 1306 may be a twist-off lid.

In some embodiments, the plurality of coupling states may include an open state and at least one closed state. Further, the straw 1304 may be configured to transition between an attached state and a removed state in relation to the tip holder end in the open state.

In some embodiments, the straw holder may include a reusable adhesive disposed on the straw holder body proximal to the tip holder end. Further, the reusable adhesive may detachably attach the straw 1304 to the tip holder end.

According to some embodiments, the straw holder body may be elastically deformable allowing the straw holder body to transition between a secure state and a separate state based on an external force. Further, the straw 1304 may detach from the tip holder end in the separate state and the straw 1304 may attach to the tip holder end in the secure state.

According to some embodiments, the straw 1304 may be elastically deformable allowing the straw 1304 to transition between a secure state and a separate state based on an external force. Further, the straw 1304 may detach from the tip holder end in the separate state and the straw 1304 may attach to the tip holder end in the secure state.

According to some embodiments, the container lid 1306 may be inseparably attached to the straw holder. Further, the base lid surface of the container lid may be inseparably attached to the base holder end of the straw holder body of the straw holder.

According to some embodiments, the straw holder may be inseparably attached to the straw 1304. Further, the tip holder end of the straw holder body of the straw holder may be inseparably attached to the first end of the straw 1304.

According to some embodiments, the container lid 1306, the straw holder, and the straw 1304 may be inseparably attached. Further, the base lid surface of the container lid 1306 may be inseparably attached to the base holder end of the straw holder body of the straw holder and the tip holder end of the straw holder body of the straw holder may be inseparably attached to the first end of the straw 1304.

Figure 15:
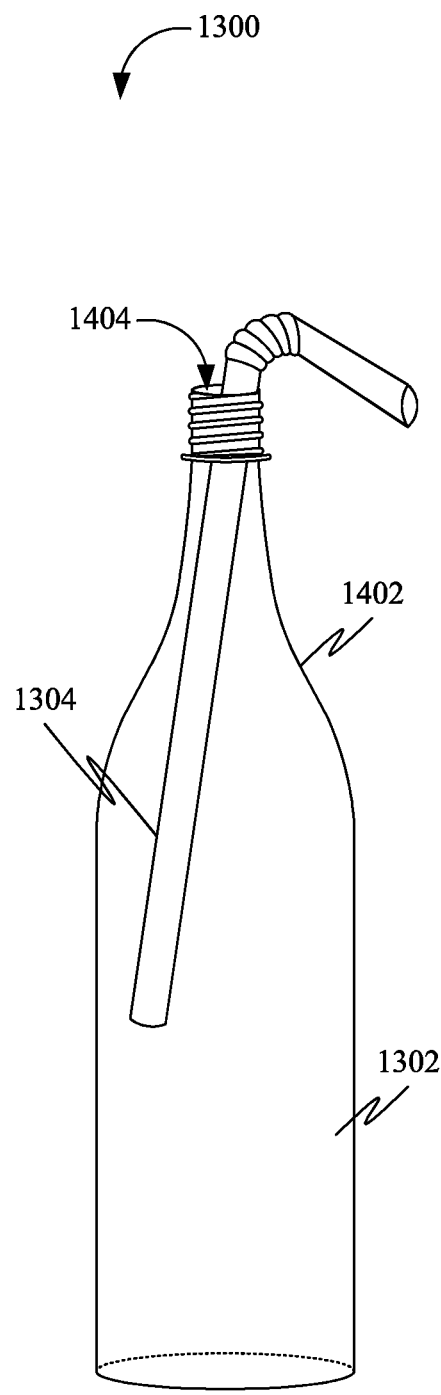
FIG. 15 is a front view of the beverage container with a straw dissociated from the container lid, in accordance with some embodiments.

FIG. 14 is a front view of the beverage container 1300 with the container lid 1306 removed from the container opening 1404, in accordance with some embodiments. FIG. 15 is a front view of the beverage container 1300 with a straw 1304 dissociated from the container lid 1306, in accordance with some embodiments.

Figure 16:
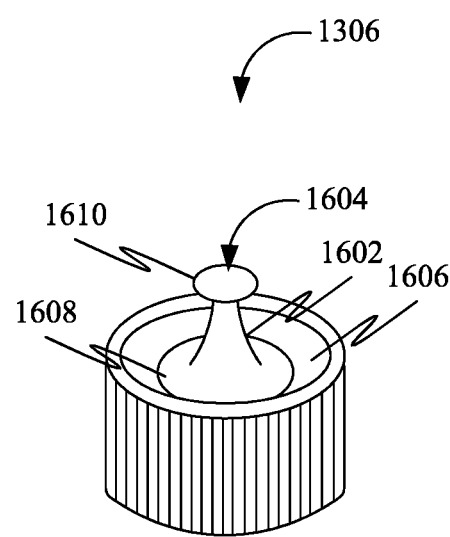
FIG. 16 is a top perspective view of a container lid, in accordance with an exemplary embodiment.
Figure 17:
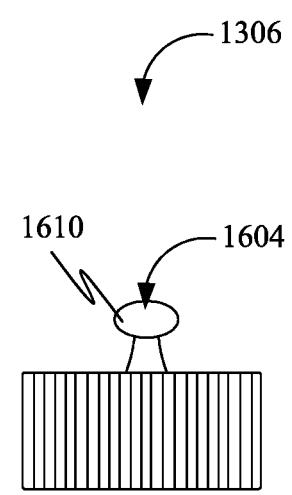
FIG. 17 is a side perspective view of the container lid, in accordance with the exemplary embodiment.
Figure 18:
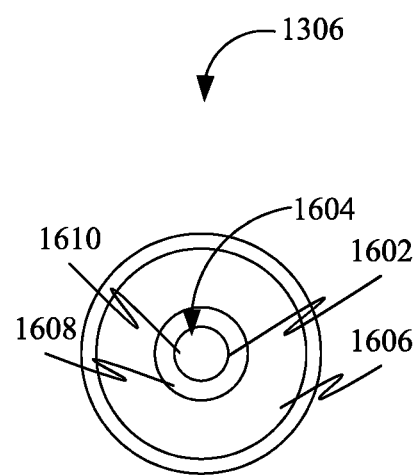
FIG. 18 is a top perspective view of the container lid, in accordance with the exemplary embodiment.
Figure 19:
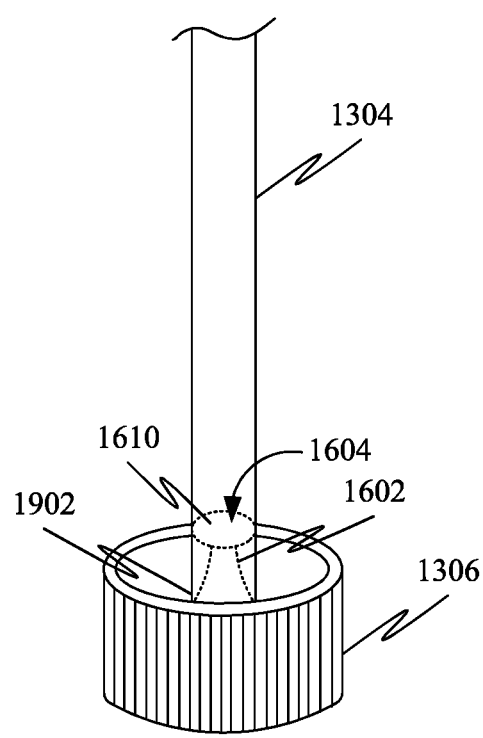
FIG. 19 is a top perspective view of the container lid attached to a straw, in accordance with the exemplary embodiment.

FIG. 16 is a top perspective view of the container lid 1306, in accordance with an exemplary embodiment. FIG. 17 is a side perspective view of the container lid 1306 in accordance with the exemplary embodiment. FIG. 18 is a top perspective view of the container lid 1306, in accordance with the exemplary embodiment. FIG. 19 is a top perspective view of the container lid 1306 attached to the straw 1304, in accordance with the exemplary embodiment. Further, the container lid 1306 may include a base lid surface 1606 and a top lid surface. Further, the container lid 1306 may be openably couplable with the container opening 1404. Further, the container lid 1306 may be associated with a plurality of coupling states in relation to the container opening 1404. Further, the container lid 1306 may include a straw holder 1602 disposed on the container lid 1306. Further, the straw holder 1602 may include a straw holder body 1604. Further, the straw holder body 1604 may extend between a base holder end 1608 and a tip holder end 1610. Further, the base holder end 1608 may be attached to the base lid surface 1606 and the tip holder end 1610 may be detachably attachable to a first end 1902 of the straw 1304, as shown in FIG. 19.

Figure 20:
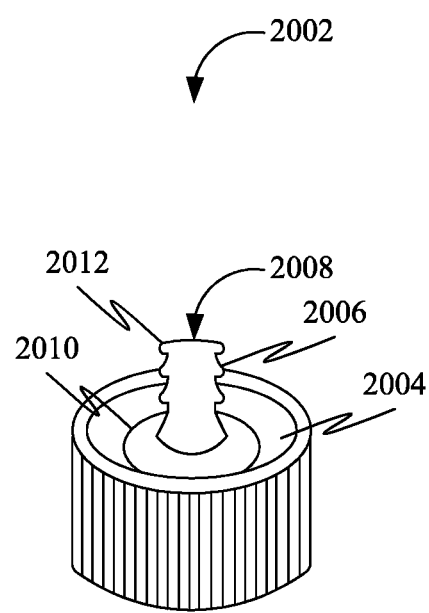
FIG. 20 is a top perspective view of a container lid, in accordance with an exemplary embodiment.

FIG. 20 is a top perspective view of a container lid 2002, in accordance with an exemplary embodiment. Further, the container lid 2002 may include a base lid surface 2004 and a top lid surface. Further, the container lid 2002 may be openably couplable with a container opening. Further, the container lid 2002 may be associated with a plurality of coupling states in relation to the container opening. Further, the container lid 2002 may include a straw holder 2006 disposed on the container lid 2002. Further, the straw holder 2006 may include a straw holder body 2008. Further, the straw holder body 2008 may extend between a base holder end 2010 and a tip holder end 2012. Further, the base holder end 2010 may be attached to the base lid surface 2004 and the tip holder end 2012 may be detachably attachable to a first end 2102 of a straw 2104 as shown in FIG. 21.

Figure 21:
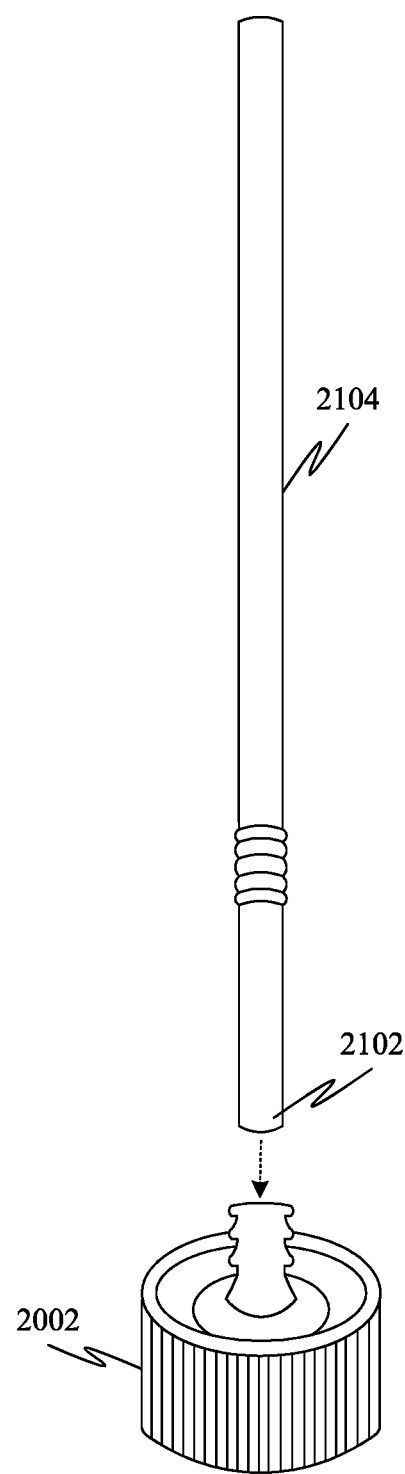
FIG. 21 is a top perspective view of the container lid dissociated from a straw, in accordance with an exemplary embodiment.

FIG. 21 is a top perspective view of the container lid 2002 dissociated from the straw 2104, in accordance with an exemplary embodiment.

Figure 22:
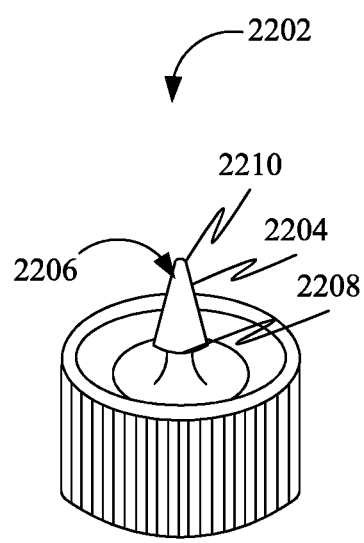
FIG. 22 is a top perspective view of a container lid, in accordance with an exemplary embodiment.

FIG. 22 is a top perspective view of a container lid 2202, in accordance with an exemplary embodiment. Further, the container lid 2202 may include a straw holder 2204 disposed on the container lid 2202. Further, the straw holder 2204 may include a straw holder body 2206. Further, the straw holder body 2206 may include an elongated body. Further, the elongated body may be associated with a body diameter and a body length. Further, the body diameter may progressively decrease along the body length from a base holder end 2208 to a tip holder end 2210. Further, the base holder end 2208 may correspond to a base body diameter of the body diameter and the tip holder end 2210 may correspond to a tip body diameter of the body diameter. Further, the tip holder end 2210 may be configured to enter a straw (such as the straw 1304) along a first body length of the body length. Further, the straw may be associated with a straw diameter. Further, the straw diameter may be greater than the tip body diameter and less than the base body diameter.

Figure 23:
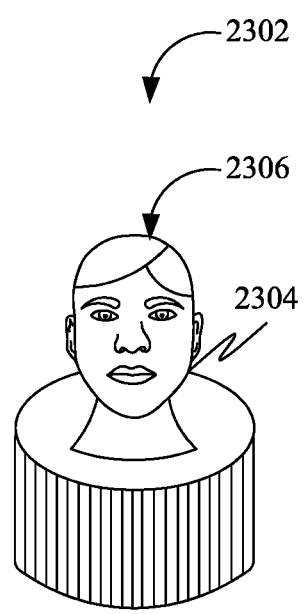
FIG. 23 is a top perspective view of a container lid, in accordance with an exemplary embodiment.

FIG. 23 is a top perspective view of a container lid 2302, in accordance with an exemplary embodiment. Further, the container lid 2302 may include a straw holder 2304 disposed on the container lid 2302. Further, the straw holder 2304 may include a straw holder body 2306. Further, the straw holder body 2306 may be configured in an anthropomorphic face.

Figure 24:
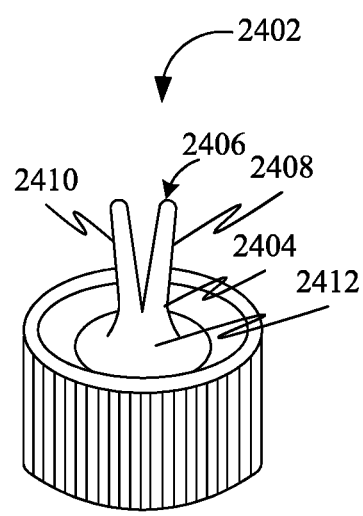
FIG. 24 is a top perspective view of a container lid, in accordance with an exemplary embodiment.

FIG. 24 is a top perspective view of a container lid 2402, in accordance with an exemplary embodiment. Further, the container lid 2402 may include a straw holder 2404 disposed on the container lid 2402. Further, the straw holder 2404 may include a straw holder body 2406. Further, the straw holder body 2406 may be shaped as two elongated segments 2408-2410 joined at a base holder end 2412.

Figure 25:
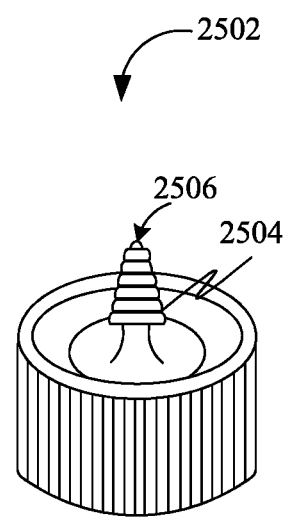
FIG. 25 is a top perspective view of a container lid, in accordance with an exemplary embodiment.

FIG. 25 is a top perspective view of a container lid 2502, in accordance with an exemplary embodiment. Further, the container lid 2502 may include a straw holder 2504 disposed on the container lid 2502. Further, the straw holder 2504 may include a straw holder body 2506. Further, the straw holder body 2506 may have conical shape as shown.

Figure 26:
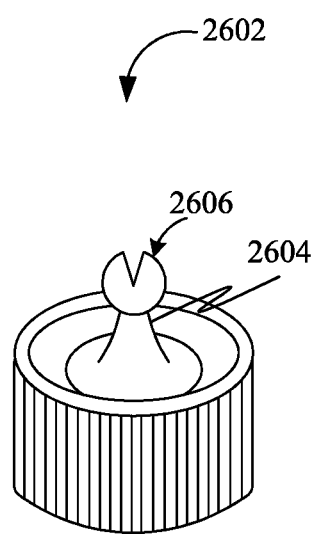
FIG. 26 is a top perspective view of a container lid, in accordance with an exemplary embodiment.

FIG. 26 is a top perspective view of a container lid 2602 in accordance with an exemplary embodiment. Further, the container lid 2602 may include a straw holder 2604 disposed on the container lid 2602. Further, the straw holder 2604 may include a straw holder body 2606. Further, the straw holder body 2606 may have spherical shape with a section removed as shown.

In some embodiments, the straw holder body may include an elongated body. Further, the elongated body may be associated with a body diameter and a body length. Further, the body diameter may remain constant along the body length from the base holder end to the tip holder end. Further, the tip holder end may be configured to enter the straw 1304 along the body length. Further, the straw 1304 may be associated with a straw diameter. Further, the straw diameter may be greater than the body diameter.

According to some embodiments, the straw holder body may include a hollow elongated body. Further, the hollow elongated body may be associated with a body diameter and a body length. Further, the body diameter may remain constant along the body length from the base holder end to the tip holder end. Further, the tip holder end may include an end opening. Further, the straw 1304 may enter the hollow elongated body along the body length through the end opening. Further, the straw 1304 may be associated with a straw diameter. Further, the straw diameter may be less than the body diameter.

According to some embodiments, the straw holder body may include a hollow elongated body. Further, the hollow elongated body may be associated with a body diameter and a body length. Further, the body diameter may progressively decrease along the body length from the tip holder end to the base holder end. Further, the base holder end may correspond to a base body diameter of the body diameter and the tip holder end may correspond to a tip body diameter of the body diameter. Further, the tip holder end may include an end opening corresponding to the tip body diameter. Further, the straw 1304 may enter the hollow elongated body along a first body length of the body length through the end opening. Further, the straw 1304 may be associated with a straw diameter. Further, the straw diameter may be less than the tip body diameter and more than the base body diameter.

According to some embodiments, the straw holder body may include at least one coupling mechanism. Further, a first part of the at least one coupling mechanism may be disposed on the tip holder end and a second part of the at least one coupling mechanism may be disposed on the first end of the straw 1304. Further, the first part and the second part may be detachably couplable.

Figure 27:
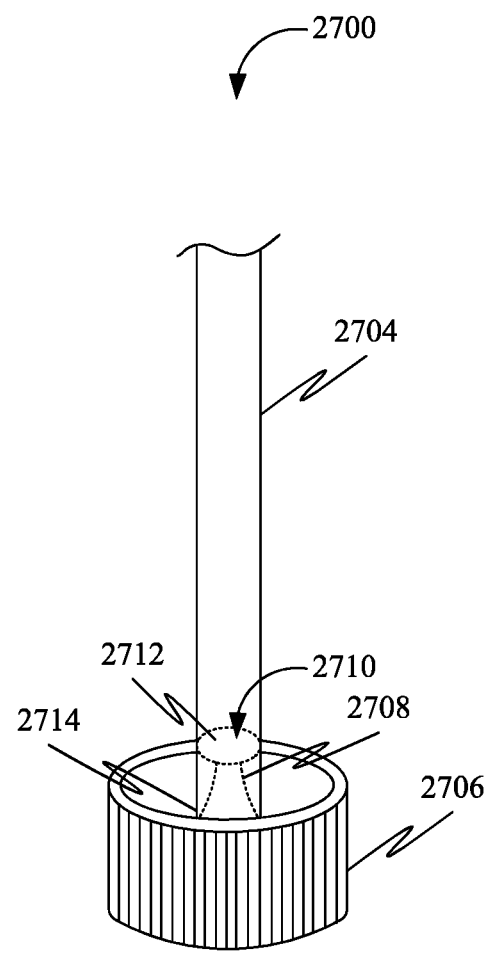
FIG. 27 is a top perspective view of a detachable straw lid for a container, in accordance with some embodiments.

FIG. 27 is a top perspective view of a detachable straw lid 2700 for a container, in accordance with some embodiments. Accordingly, the detachable straw lid 2700 may include a container lid 2706 and a straw 2704.

Figure 28:
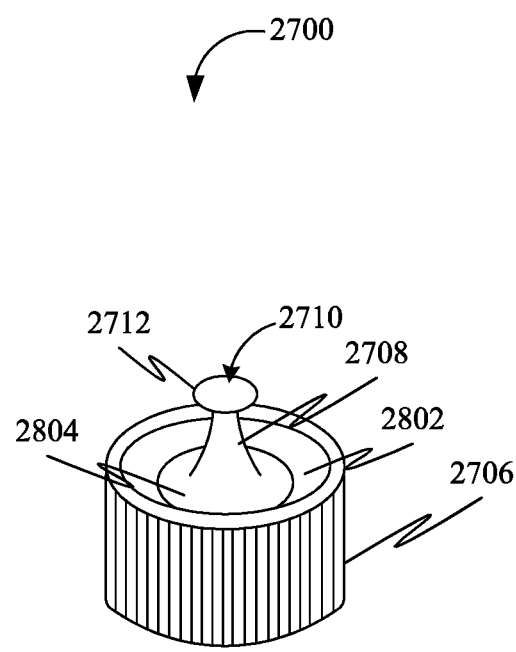
FIG. 28 is a top perspective view of the detachable straw lid for the container, in accordance with some embodiments.

Further, the container lid 2706 may be openably couplable with a container opening of the container. Further, the container may be configured for storing at least one beverage. Further, the container lid 2706 may include a base lid surface 2802, as shown in FIG. 28, and a top lid surface (not shown). Further, the container lid 2706 may be associated with a plurality of coupling states in relation to the container opening. Further, the container lid 2706 may include a straw holder 2708 disposed on the container lid 2706. Further, the straw holder 2708 may include a straw holder body 2710. Further, the straw holder body 2710 may extend between a base holder end 2804, as shown in FIG. 28, and a tip holder end 2712. Further, the base holder end 2804 may be attached to the base lid surface 2802.

Further, the straw 2704 may be detachably attachable to the container lid 2706. Further, the straw 2704 may facilitate drinking of the at least one beverage from the container. Further, a first end 2714 of the straw 2704 may be detachably attachable to the tip holder end 2712.

According to some embodiments, the straw holder body 2710 may be elastically deformable allowing the straw holder body 2710 to transition between a secure state and a separate state based on an external force. Further, the straw 2704 may detach from the tip holder end 2712 in the separate state and the straw 2704 may attach to the tip holder end 2712 in the secure state.

According to some embodiments, the straw 2704 may be elastically deformable allowing the straw 2704 to transition between a secure state and a separate state based on an external force. Further, the straw 2704 may detach from the tip holder end 2712 in the separate state and the straw 2704 may attach to the tip holder end 2712 in the secure state.

According to some embodiments, the straw holder body 2710 may include an elongated body. Further, the elongated body may be associated with a body diameter and a body length. Further, the body diameter may remain constant along the body length from the base holder end 2804 to the tip holder end 2712. Further, the tip holder end 2712 may be configured to enter the straw 2704 along the body length. Further, the straw 2704 may be associated with a straw diameter. Further, the straw diameter may be greater than the body diameter.

According to some embodiments, the straw holder body 2710 may include an elongated body. Further, the elongated body may be associated with a body diameter and a body length. Further, the body diameter may progressively decrease along the body length from the base holder end 2804 to the tip holder end 2712. Further, the base holder end 2804 may correspond to a base body diameter of the body diameter and the tip holder end 2712 may correspond to a tip body diameter of the body diameter. Further, the tip holder end 2712 may be configured to enter the straw 2704 along a first body length of the body length. Further, the straw 2704 may be associated with a straw diameter. Further, the straw diameter may be greater than the tip body diameter and less than the base body diameter.

Figure 29:
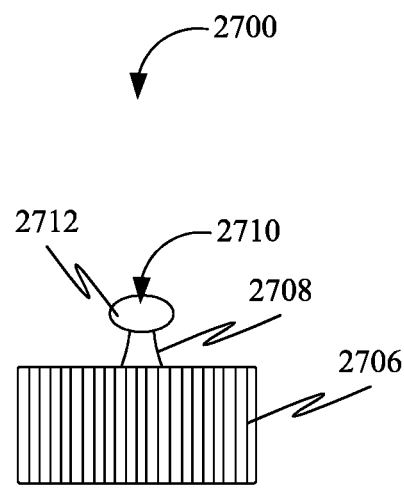
FIG. 29 is a side view of the detachable straw lid for the container, in accordance with some embodiments.

FIG. 28 is a top perspective view of the detachable straw lid 2700 for the container, in accordance with some embodiments. FIG. 29 is a side view of the detachable straw lid 2700 for the container, in accordance with some embodiments.

Figure 30:
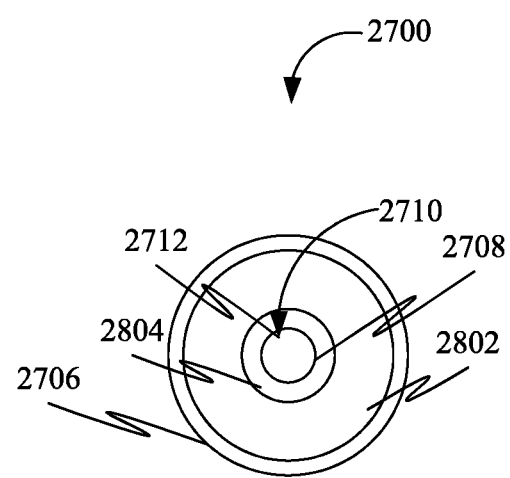
FIG. 30 is a top view of the detachable straw lid for the container, in accordance with some embodiments.
Figure 31:
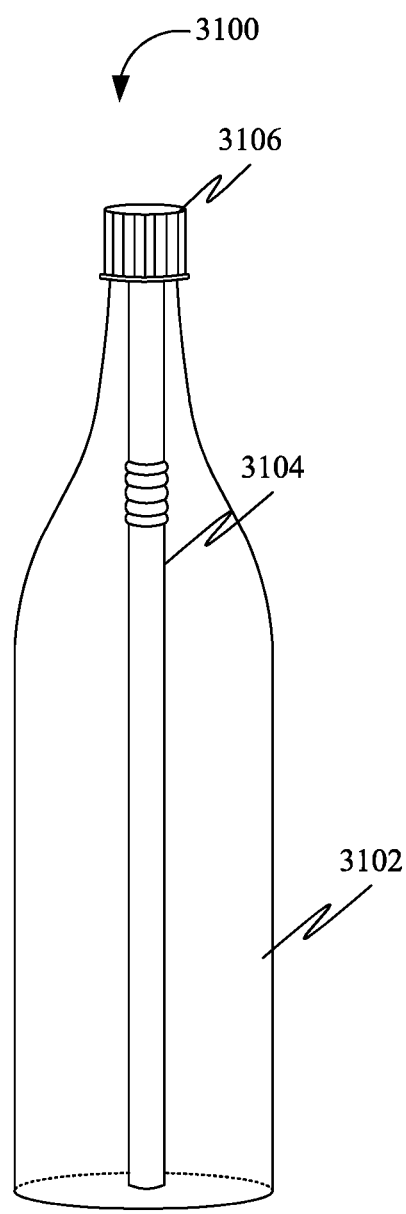
FIG. 31 is a side perspective view of a detachable straw lid with a container lid coupled to a container opening of a container, in accordance with an exemplary embodiment.
Figure 32:
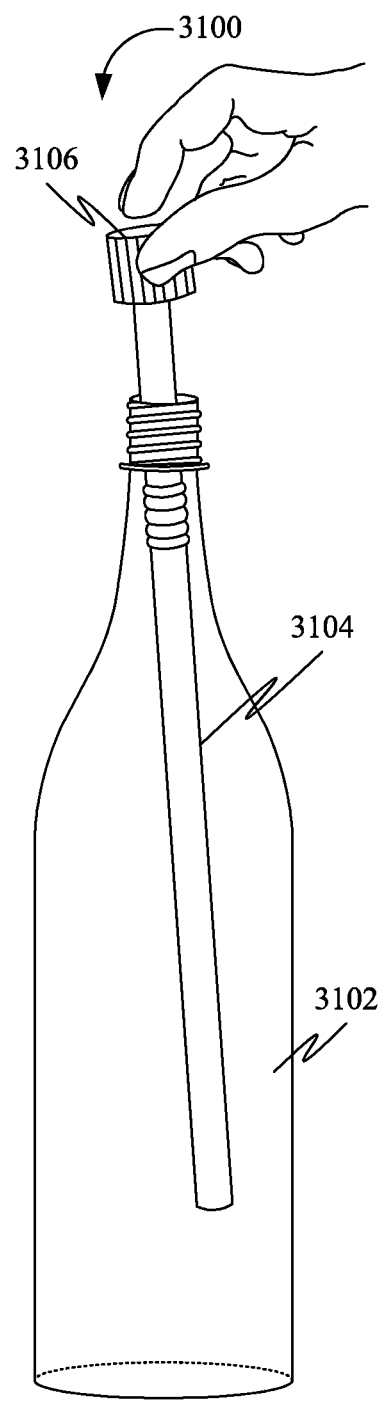
FIG. 32 is a side perspective view of the detachable straw lid with the container lid removed from the container opening of the container, in accordance with the exemplary embodiment.

FIG. 30 is a top view of the detachable straw lid 2700 for the container, in accordance with some embodiments. FIG. 31 is a side perspective view of a detachable straw lid 3100 with a container lid 3106 coupled to a container opening of a container 3102, in accordance with an exemplary embodiment. Further, the container lid 3106 may be coupled to the container opening of the container 3102. Further, a straw 3104 may be disposed of in the container 3102. FIG. 32 is a side perspective view of the detachable straw lid 3100 with the container lid 3106 removed from the container opening of the container 3102, in accordance with the exemplary embodiment.

Figure 33:
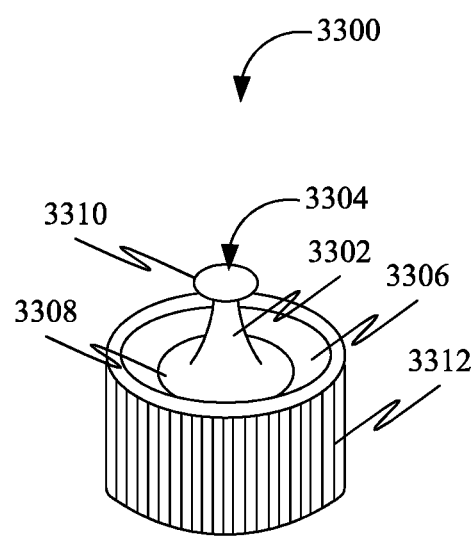
FIG. 33 is a top perspective view of a detachable straw lid for a container, in accordance with some embodiments.

FIG. 33 is a top perspective view of a detachable straw lid 3300 for a container, in accordance with some embodiments. Accordingly, the detachable straw lid 3300 may include a container lid 3312.

Figure 34:
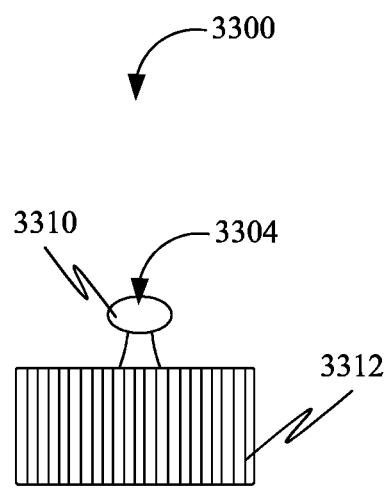
FIG. 34 is a side view of the detachable straw lid for the container, in accordance with some embodiments.
Figure 35:
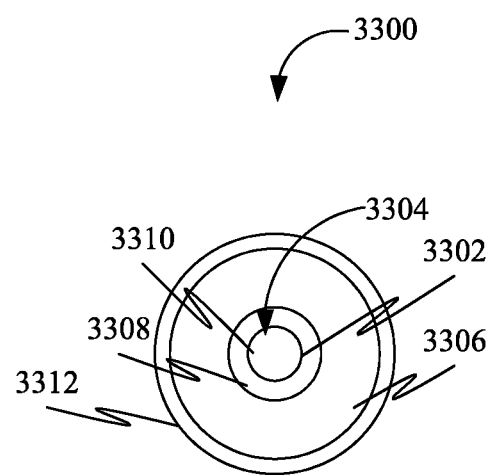
FIG. 35 is a top view of the detachable straw lid for the container, in accordance with some embodiments.
Figure 36:
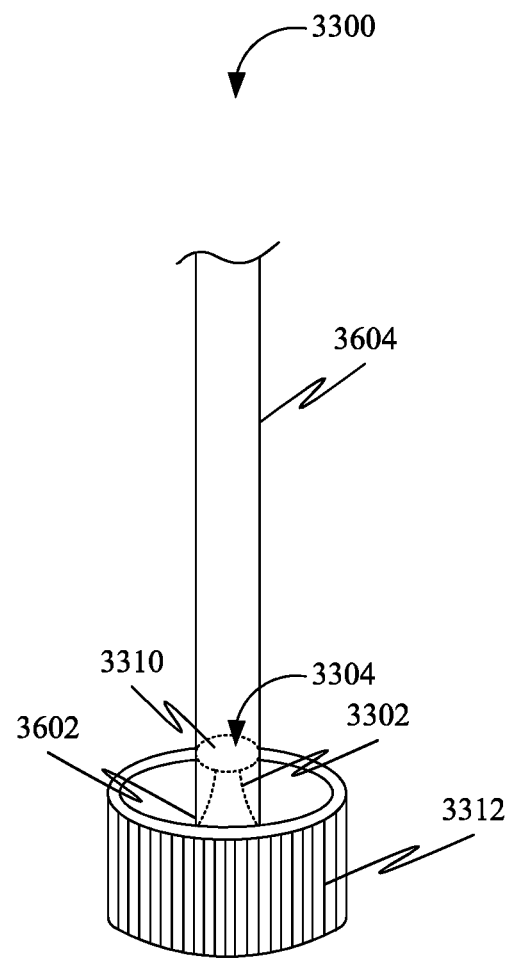
FIG. 36 is a top perspective view of the detachable straw lid for the container with the straw, in accordance with some embodiments.

Further, the container lid 3312 may be openably couplable with a container opening of the container. Further, the container may be configured for storing at least one beverage. Further, the container lid 3312 may include a base lid surface 3306 and a top lid surface (not shown). Further, the container lid 3312 may be associated with a plurality of coupling states in relation to the container opening. Further, the container lid 3312 may include a straw holder 3302 disposed on the container lid 3312. Further, the straw holder 3302 may include a straw holder body 3304. Further, the straw holder body 3304 may extend between a base holder end 3308 and a tip holder end 3310. Further, the base holder end 3308 may be attached to the base lid surface 3306. Further, the tip holder end 3310 may be detachably attachable to a first end 3602 of a straw 3604, as shown in FIG. 36. Further, the straw 3604 may facilitate drinking of the at least one beverage from the container. FIG. 34 is a side view of the detachable straw lid 3300 for the container, in accordance with some embodiments. FIG. 35 is a top view of the detachable straw lid 3300 for the container, in accordance with some embodiments. FIG. 36 is a top perspective view of the detachable straw lid 3300 for the container with the straw 3604, in accordance with some embodiments.

Figure 37:
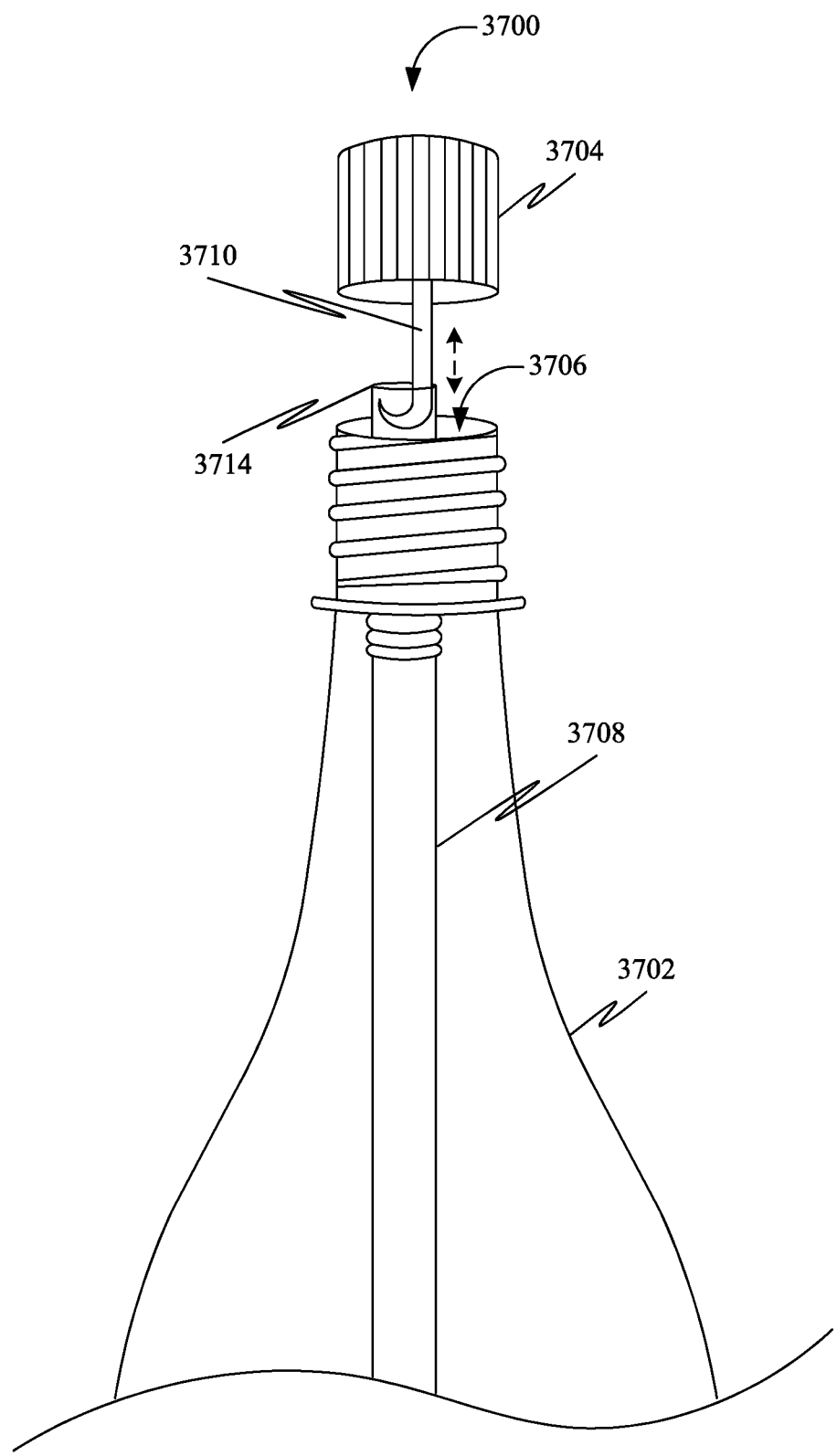
FIG. 37 is a side perspective view of a disposable lid for facilitating holding of a detachable straw, in accordance with some embodiments

FIG. 37 is a side perspective view of a disposable lid 3700 for facilitating holding of a detachable straw, in accordance with some embodiments. Further, the disposable lid 3700 may include a container lid 3704 and a straw 3708. Further, the container lid 3704 may be openably couplable with a container opening 3706 of a container 3702. Further, the container 3702 may be configured for storing at least one beverage. Further, the container lid 3704 may include a base lid surface and a top lid surface. Further, the container lid 3704 may be associated with a plurality of coupling states in relation to the container opening 3706. Further, the container lid 3704 may include a straw holder 3710 disposed on the container lid 3704. Further, the straw holder 3710 may be configured for detachably attaching the container lid 3704 to the container 3702. Further, the straw holder 3710 may include a straw holder body. Further, the straw holder body extends between a base holder end and a tip holder end. Further, the base holder end may be attached to the base lid surface. Further, the straw holder body may be detachably attachable to the container 3702.

Further, the straw 3708 may be detachably attachable to the container lid 3704. Further, the straw 3708 facilitates drinking of the at least one beverage from the container 3702. Further, a first end 3714 of the straw 3708 may be detachably attachable to the straw holder body.

Figure 38:
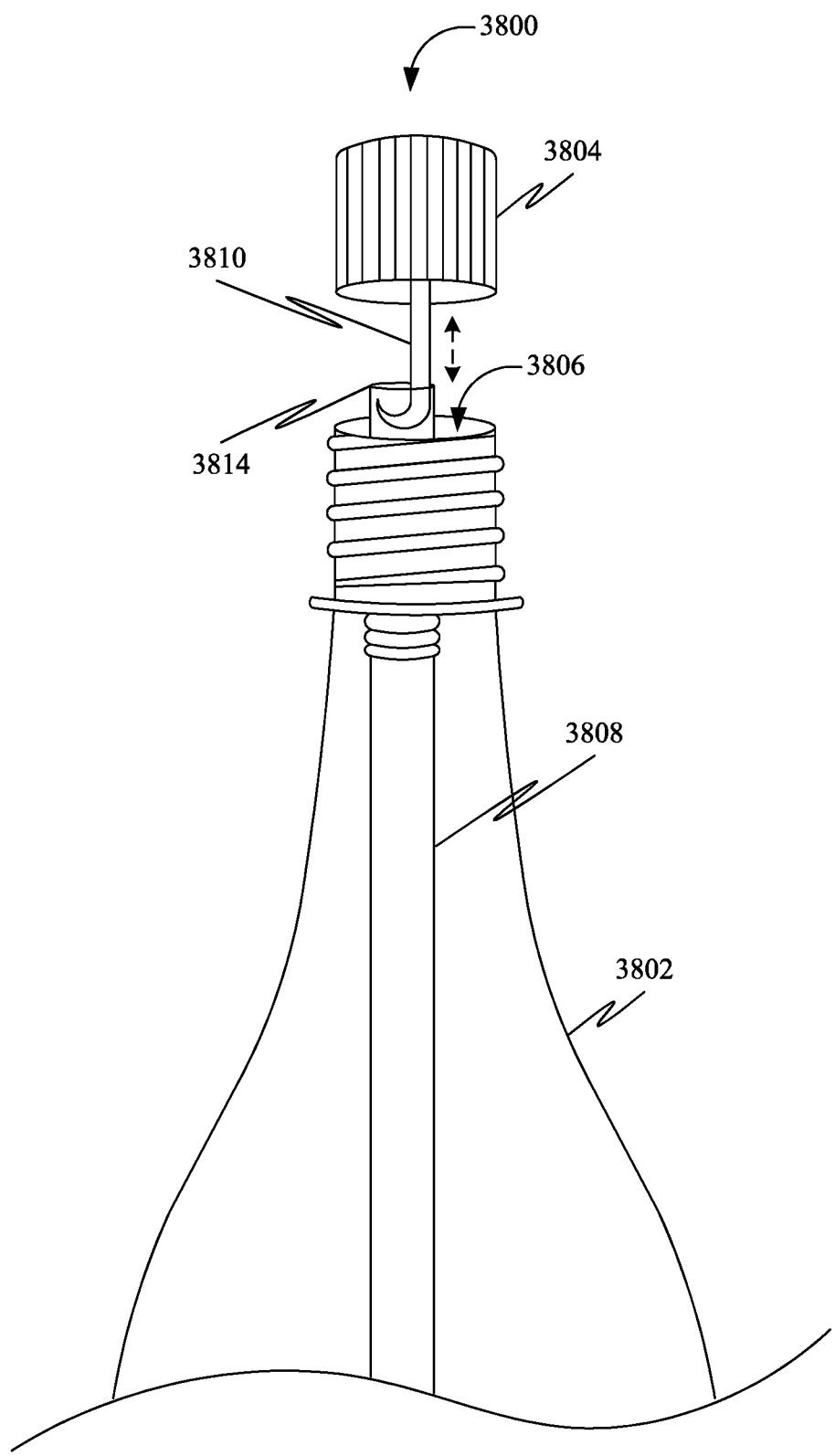
FIG. 38 is a partial front perspective view of a disposable container for facilitating holding of a detachable straw, in accordance with some embodiments.

FIG. 38 is a partial front perspective view of a disposable container 3800 for facilitating holding of a detachable straw, in accordance with some embodiments. Further, the disposable container 3800 may include a container 3802, a straw 3808, and a container lid 3804.

Further, the container 3802 may be configured for storing at least one beverage. Further, the container 3802 may include a container body and a container opening 3806 disposed on the container body.

Further, the straw 3808 may be disposed in the container 3802. Further, the straw 3808 facilitates drinking of the at least one beverage from the container 3802.

Further, the container lid 3804 may include a base lid surface and a top lid surface. Further, the container lid 3804 may be openably couplable with the container opening 3806. Further, the container lid 3804 may be associated with a plurality of coupling states in relation to the container opening 3806. Further, the container lid 3804 may include a straw holder 3810 disposed on the container lid 3804. Further, the straw holder 3810 may be configured for detachably attaching the straw 3808 to the container lid 3804. Further, the straw holder 3810 may be configured for detachably attaching the container lid 3804 to the container 3802. Further, the straw holder 3810 may include a straw holder body. Further, the straw holder body extends between a base holder end and a tip holder end. Further, the base holder end may be attached to the base lid surface. Further, the straw holder body may be detachably attachable to a first end 3814 of the straw 3808. Further, the straw holder body may be detachably attachable to the container 3802.

Although the present disclosure has been explained in relation to its preferred embodiment, it is to be understood that many other possible modifications and variations can be made without departing from the spirit and scope of the disclosure.

What is claimed is:

1. A disposable lid for facilitating holding of a detachable straw, the disposable lid comprising:
a container lid openably couplable with a container opening of a container, wherein the container is configured for storing at least one beverage, wherein the container lid comprises a base lid surface and a top lid surface, wherein the container lid is associated with a plurality of coupling states in relation to the container opening, wherein the container lid comprises a straw holder disposed on the container lid, wherein the straw holder is configured for detachably attaching a straw to the container lid, wherein the straw holder is configured for detachably attaching the container lid to the container, wherein the straw holder comprises a straw holder body, wherein the straw holder body extends between a base holder end and a tip holder end, wherein the base holder end is attached to the base lid surface, wherein the straw holder body is detachably attachable to a first end of the straw, wherein the straw holder body is detachably attachable to the container, wherein the straw facilitates drinking of the at least one beverage from the container; wherein the straw holder body comprises an elongated body, wherein the elongated body is associated with a body diameter and a body length, wherein the straw is associated with a straw diameter, and wherein the straw diameter is greater than the body diameter; and wherein the tip holder end of the straw holder body is configured to enter to the first end of the straw.

2. The disposable lid of claim 1, wherein the container lid comprises at least one plastic material, wherein the at least one plastic material is disposable.

3. The disposable lid of claim 1, wherein the straw holder body comprises a curved member forming a hook, wherein the hook is configured to latch on the first end of the straw for detachably attaching the straw to the container lid.

4. The disposable lid of claim 1, wherein the straw holder body is elastically deformable allowing the straw holder body to transition between a secure state and a separate state based on an external force, wherein the straw detaches from the straw holder body in the separate state and the straw attaches to the straw holder body in the secure state.

5. The disposable lid of claim 1, wherein the plurality of coupling states comprises an open state and at least one closed state, wherein the straw is configured to transition between an attached state and a removed state in relation to the straw holder body in the open state.

6. The disposable lid of claim 1, wherein the container lid is inseparably attached to the straw holder, wherein the base lid surface of the container lid is inseparably attached to the base holder end of the straw holder body of the straw holder.

7. The disposable lid of claim 1, wherein the straw holder body comprises a curved member forming a hook, wherein the hook is configured to latch on a container rim of the container opening for detachably attaching the container lid to the container.

* * * * *